Aug. 27, 1968  H. E. MATHES ETAL  3,398,661
FRAME BLANK FORMING MACHINE
Filed Sept. 20, 1966  7 Sheets-Sheet 5
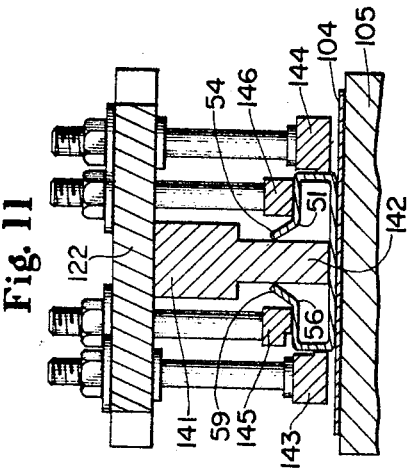
Fig. 10
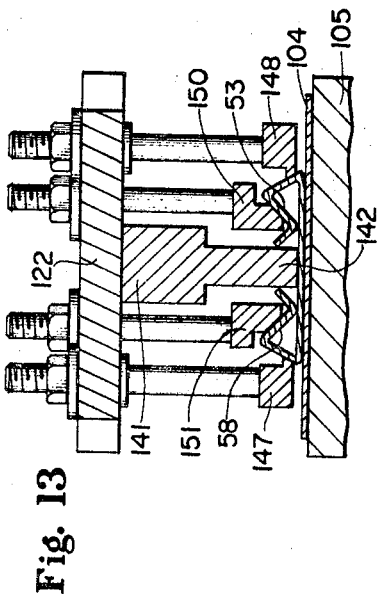
Fig. 11
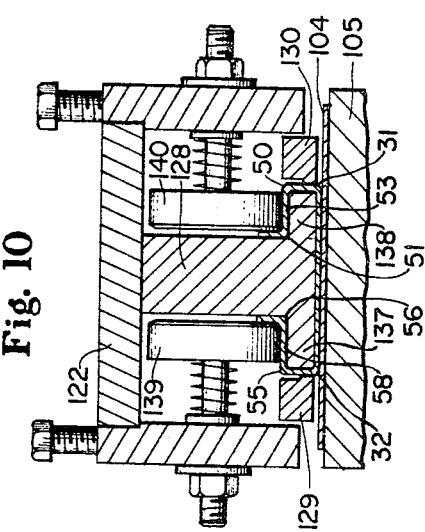
Fig. 12
Fig. 13
INVENTORS
Howard E. Mathes
Charles R. Hood
BY
*Frederick H. Braun*
ATTORNEY Aug. 27, 1968 H. E. MATHES ETAL 3,398,661
FRAME BLANK FORMING MACHINE
Filed Sept. 20, 1966
7 Sheets-Sheet 6

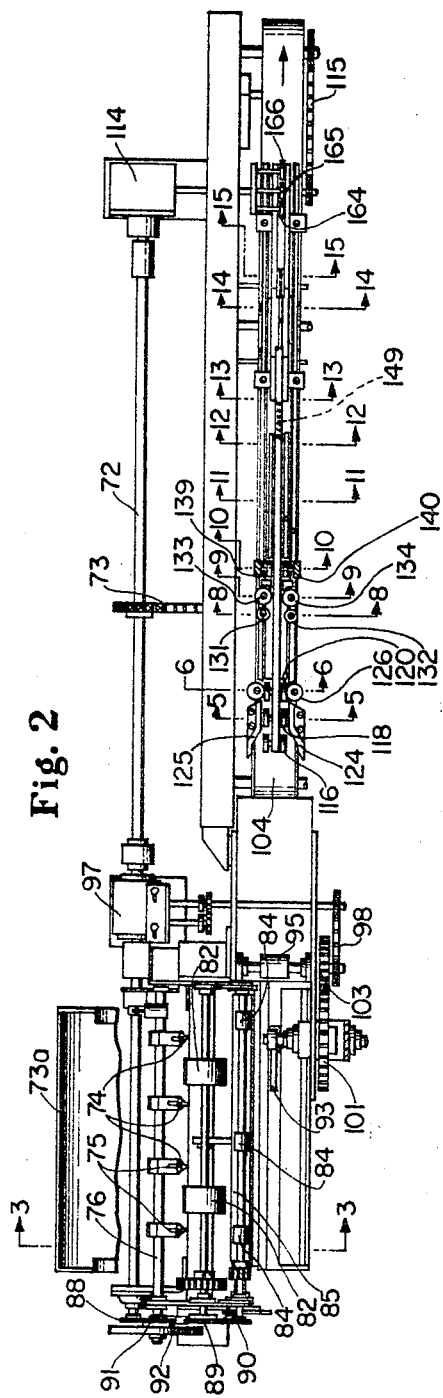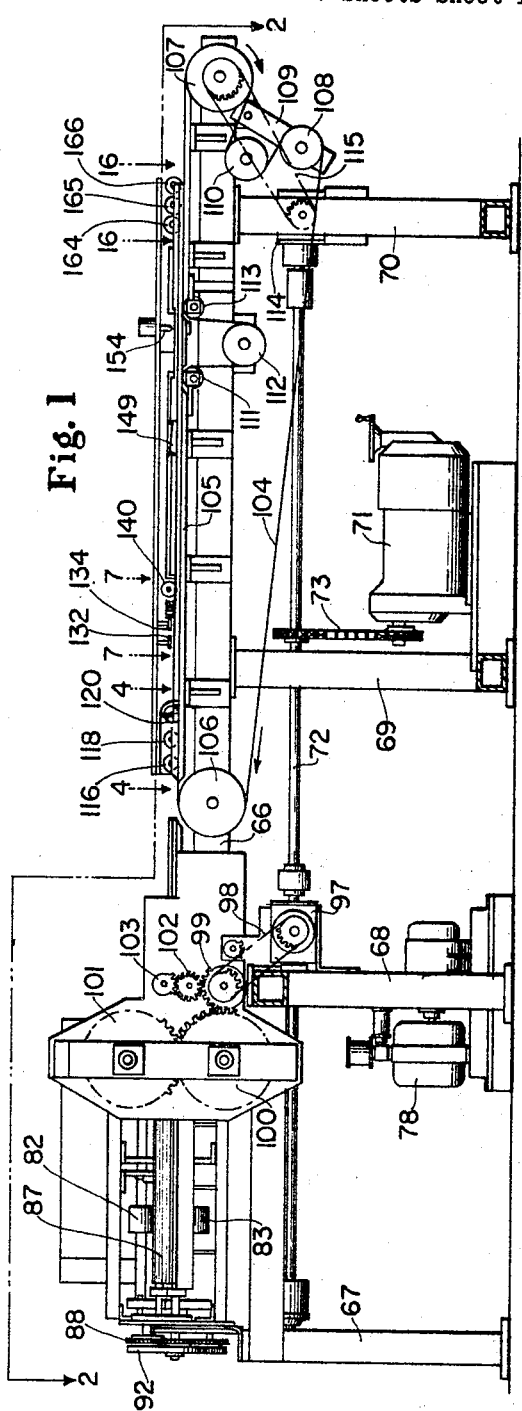

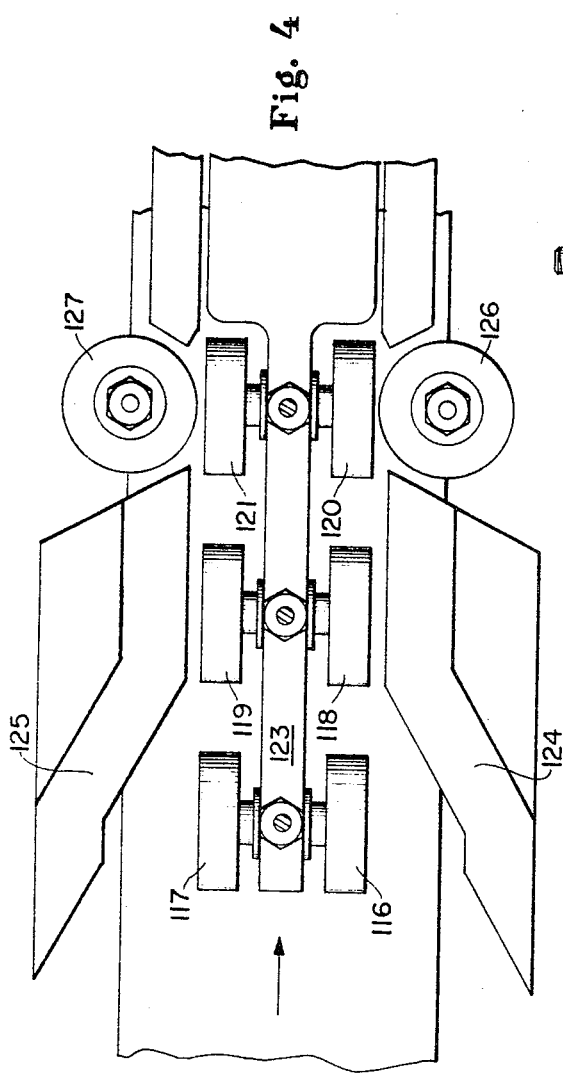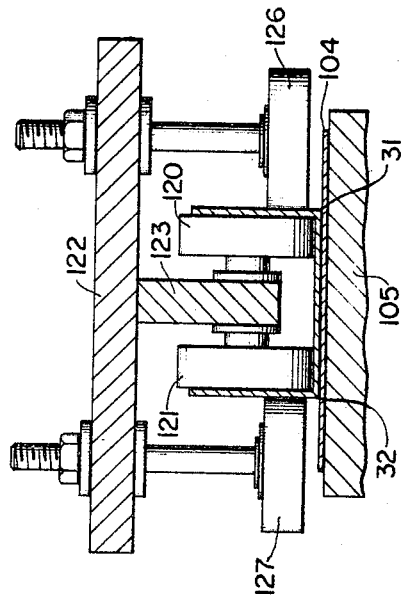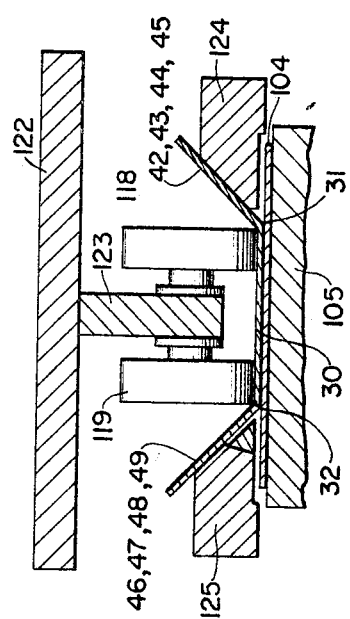

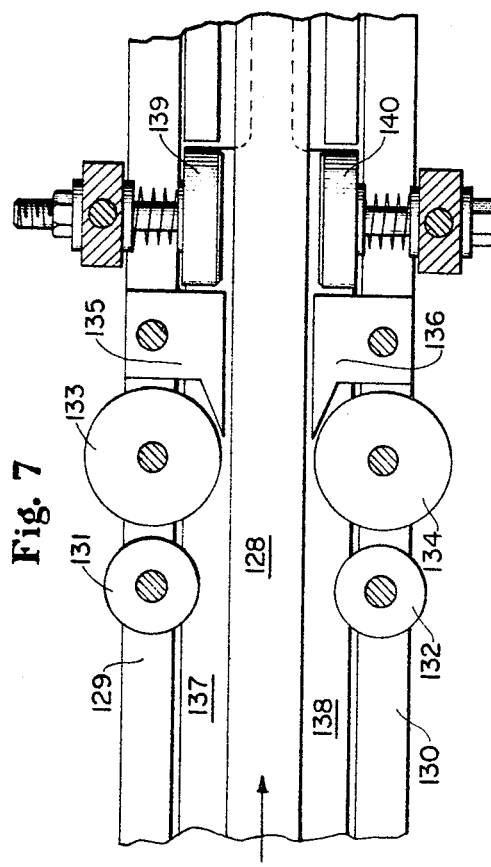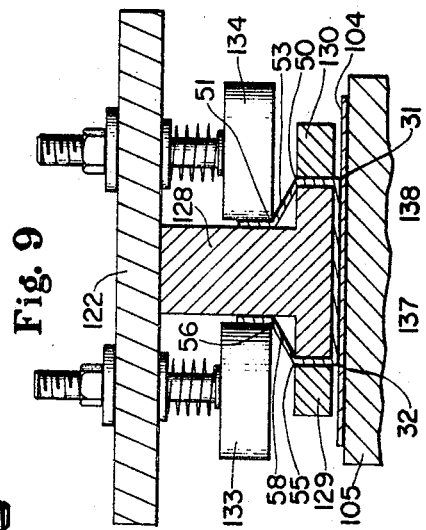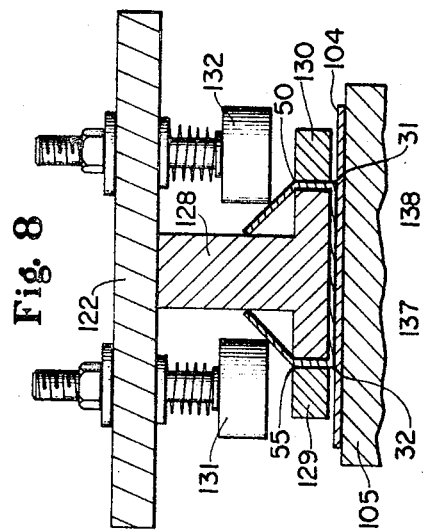

INVENTORS
Howard E. Mathes
Charles R. Hood
BY
*Fredrick H. Brown*
ATTORNEY

Aug. 27, 1968     H. E. MATHES ETAL     3,398,661
FRAME BLANK FORMING MACHINE

Filed Sept. 20, 1966     7 Sheets-Sheet 7

INVENTORS
Howard E. Mathes
Charles R. Hood
BY
*Fredrik H. Braun*

ATTORNEY

United States Patent Office 3,398,661
Patented Aug. 27, 1968

3,398,661
FRAME BLANK FORMING MACHINE
Howard E. Mathes, Harlan Township, Warren County, and Charles R. Hood, Springfield Township, Hamilton County, Ohio, assignors to The Procter & Gamble Company, Cincinnati, Ohio, a corporation of Ohio
Filed Sept. 20, 1966, Ser. No. 580,814
10 Claims. (Cl. 93—52)

This invention relates to the art of packaging machines. More particularly, the invention relates to a machine for transforming a cut and scored flat blank of packaging material into a frame blank which may subsequently be formed around an article as a display package.

The inventive concept involves the provision of a machine which has as its primary object the capability of making frame blanks of the type generally disclosed in FIGURE 2 of U.S. Patent 3,262,620 issued on July 26, 1966, to Robert V. Burt et al. and commonly owned by the assignee of the present invention.

In a generic sense, it is an object to provide a machine having the ability to fold and form tubular support elements on the longitudinal edges of a flat packaging blank to form a frame blank. The cross sectional configuration of the tubular support elements may be a three or four sided geometric figure with either one or two tubular support elements formed on each blank. When two tubular supports are formed they may or may not be geometrically congruent. In the preferred form of the machine as herein described, two tubular support elements are formed on the frame blank, said elements being of triangular configuration and geometrically congruent.

*Brief summary of the invention*

The machine of the present invention comprises a hopper designed to receive a stack of flat packaging blanks. The blanks are cut and scored prior to placement in the machine such that each blank is divided into a plurality of adjoining wall panels having extending portions projecting laterally from the side edges thereof. The extending portions are divided into adjoining areas by a plurality of parallel longitudinal scores.

A vacuum cup picker device is provided to successively pull out and feed individual packaging blanks to a series of lateral feed rolls which move the blanks to a stationary stop overlying a dead plate. The stop is provided to align the blanks longitudinally prior to their being fed into the forming machine. A suitable device is provided for thereafter feeding the blanks lengthwise to the forming elements of the machine.

As each blank is moved through the forming elements of the machine, it is carried by an endless belt and a series of idling nip rollers hold the blank against the belt during the folding sequence. The blank is thereby moved through a series of folding means including properly positioned idling rolls for breaking the score lines and where folding of the blank is severe. Stationary guides are used to hold the shape of the formed frame after the longitudinal edge portions of the blank are folded and formed into tubular support elements. Means are provided for applying adhesive to permanently bond the tubular support elements to the frame blank so that it retains its desired shape and form after completing its movement through the machine.

*Brief description of the several views of the drawings*

FIGURE 1 is a side elevation of the machine of the invention showing the relative relationship of the various elements thereof.

FIGURE 2 is a plan view of the machine partially in cross section taken on the line 2—2 of FIGURE 1.

FIGURE 4 is a fragmentary plan view in cross section taken on the line 4—4 of FIGURE 1 showing details of the first group of folding elements.

FIGURE 5 is a fragmentary cross section in elevation taken on the line 5—5 of FIGURE 2 showing details of certain folding elements.

FIGURE 6 is a fragmentary cross section in elevation taken on the line 6—6 of FIGURE 2 showing details of certain folding elements.

FIGURE 7 is a fragmentary plan view in cross section taken on the line 7—7 of FIGURE 1 showing details of the second group of folding elements.

FIGURE 8 is a fragmentary cross section taken on the line 8—8 of FIGURE 2 showing additional details of the folding mechanism.

FIGURE 9 is a fragmentary cross section taken on the line 9—9 of FIGURE 2 showing additional details of the folding mechanism.

FIGURE 10 is a fragmentary cross section taken on the line 10—10 of FIGURE 2 showing additional details of the folding mechanism.

FIGURE 11 is a fragmentary cross section taken on the line 11—11 of FIGURE 2 showing additional details of the folding mechanism.

FIGURE 12 is a fragmentary cross section taken on the line 12—12 of FIGURE 2 showing additional details of the folding mechanism.

FIGURE 13 is a fragmentary cross section taken on the line 13—13 of FIGURE 2 showing additional details of the folding mechanism.

*Frame blank made by machine*

As previously indicated, the present machine was invented for making a frame blank which can be formed into a display package of the type generally disclosed in U.S. Patent 3,262,620 issued to Robert V. Burt et al. The machine is particularly suited for high speed operation in transforming a flat packaging blank of the kind illustrated in FIGURE 17 into a frame blank of the kind illustrated in FIGURE 18. The frame blank of FIGURE 18 can then be made into a dispensing and display package of the type described and claimed in the aforesaid Burt et al. patent although the details of assembling the package around suitable articles do not form any part of the present invention.

Figure 17:
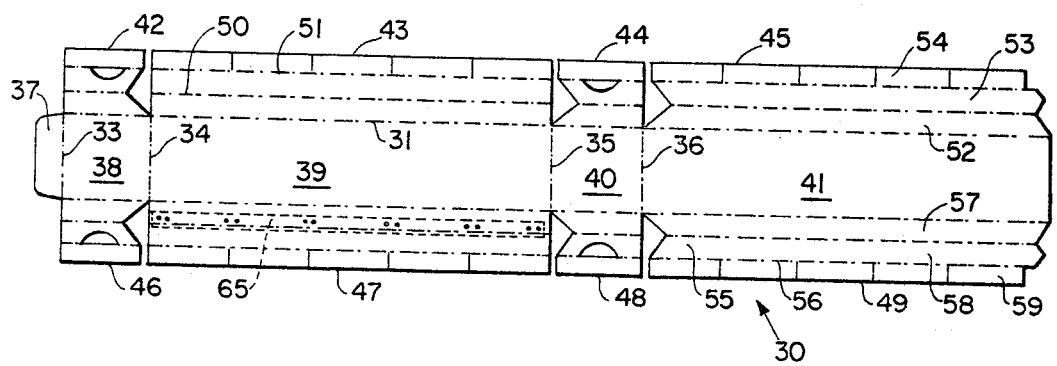
FIGURE 17 is a plan view of the flat packaging blank which is placed in the hopper of the machine.

The flat packaging blank 30 of FIGURE 17 is preferably made from a typical packaging material such as paperboard, cardboard, or the like. The blank 30 is cut and scored prior to being stacked in the machine hopper. A pair of longitudinal scores 31 and 32 divide the blank longitudinally and the transverse scores 33, 34, 35 and 36 divide the blank laterally. The aforementioned scores divide the blank into the end tab 37 and a series of adjoining wall panels 38, 39, 40 and 41.

Projecting laterally from each of the wall panels on the upper side are the extending portions 42, 43, 44 and 45. Similiarly, there are congruent lateral projections from the lower side of the wall panels which comprise the extending portions 46, 47, 48 and 49. Each of the extending portions are separated by angular cut-outs as illustrated. Each of the extending portions 42, 43, 44 and 45 are separated by longitudial scores 50 and 51 into an inner area 52, an intermediate area 53 and an outer area 54. Similarly, each of the extending portions 46, 47, 48 and 49 are separated by the longitudinal scores 55 and 56 into an inner area 57, an intermediate area 58 and an outer area 59.

Figure 18:
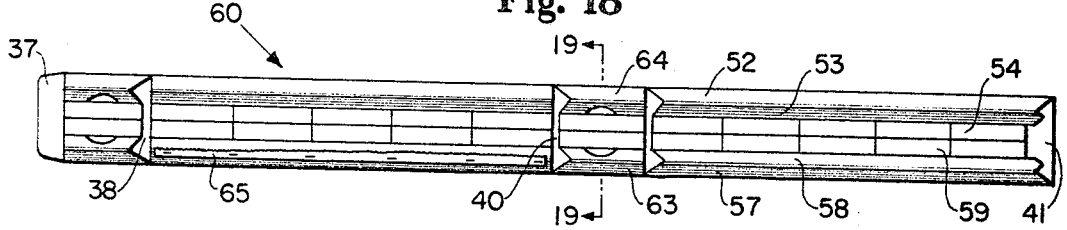
FIGURE 18 is a plan view of a frame blank made by the machine from the packaging blank of FIGURE 17.
Figure 19:
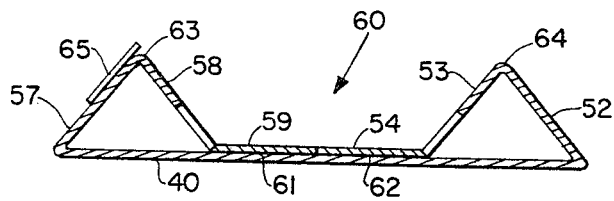
FIGURE 19 is a cross section through the frame blank of FIGURE 18 taken on the line 19—19.

The flat blank 30 of FIGURE 17 can be transformed into the frame blank 60 of FIGURE 18 by suitably folding and bending the blank on the score lines 31, 32, 50, 51, 55 and 56 to form the configuration shown in cross section in FIGURE 19. The outer areas 54 and 59 are preferably adhered to the wall panels 38, 39, 40 and 41 as at 61 and 62 in FIGURE 19. This maintains the frame blank 60 in proper assembled relationship as illustrated in FIGURES 18 and 19. Tubular support elements 63 and 64 of triangular configuration are formed by this transformation which are useful to reinforce and strengthen the frame blank 60 when it is ultimately formed into a package.

When the frame blank 60 is ultimately intended for use as a package for a roll of paper or like material, a cutting knife 65 may be adhered or stapled to the inner area 57 of the extending portion 47 in the blank 30 so that it assumes the position illustrated in FIGURES 18 and 19 when the frame blank 60 is completed.

*Description of machine structure*

The general arrangement of the complete machine is illustrated in FIGURES 1 and 2. The machine is mounted on a suitable frame 66 which is supported by the legs 67, 68, 69 and 70. A suitable motive power source 71 which may be in the form of a motor having a built-in reduction gear is provided to continuously rotate the main drive shaft 72 by means of the chain 73. The main drive shaft 72 is suitably mounted and supported by the machine frame 66.

Figure 3:
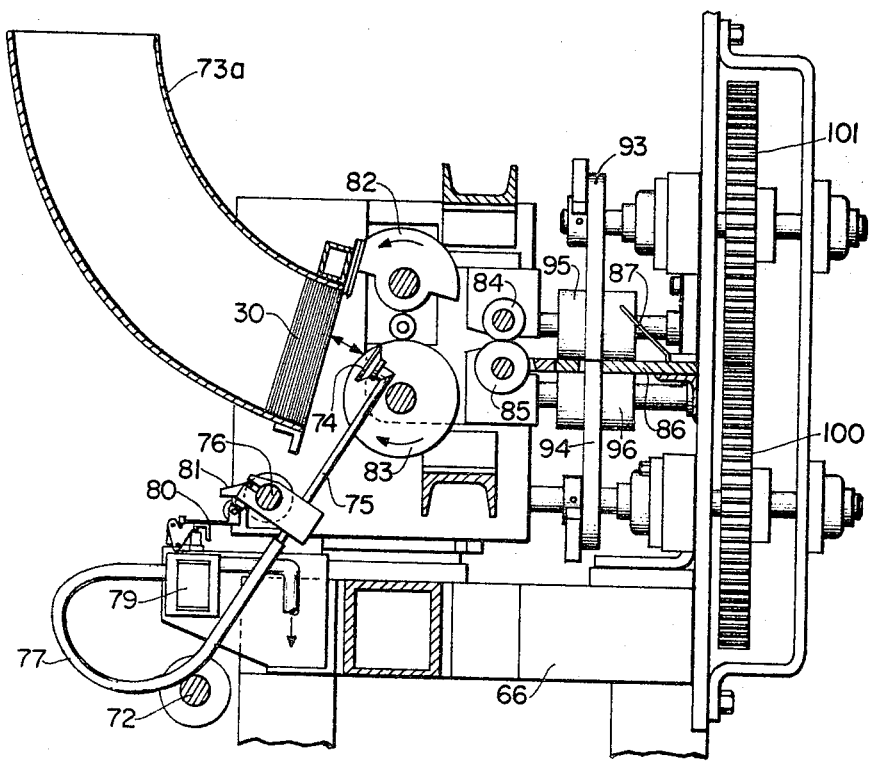
FIGURE 3 is an end elevation in cross section taken on the line 3—3 of FIGURE 2 showing the details of the hopper and picker mechanism for feeding blanks into the machine.

Referring now to FIGURES 2 and 3, the hopper and blank feed mechanism will be described as shown in detail therein. The hopper 73a is of arcuate configuration and suitably arranged to receive a stack of flat packaging blanks 30 such that the end tab 37 is facing to the right when viewing the machine in FIGURES 1 and 2.

A plurality of vacuum cups 74 are mounted on hollow arms 75 which are secured to the oscillating shaft 76. A flexible vacuum conduit 77 is provided at the end of each of the hollow arms 75. The conduits 77 are in communication with the vacuum pump 78 shown in FIGURE 1. A vacuum switch 79 is provided which is actuated by the arm 80. An actuating member 81 is secured to the oscillating shaft 76 to periodically contact the arm 80 and thereby control vacuum to the cups 74. Thus, as the vacuum cups 74 move toward the blanks 30 in the hopper 74 the arm 81 actuates the switch 79 to connect vacuum cups 74 with the vacuum pump 78. As a result, the vacuum cups 74 engage the lowermost blank in the hopper and remove it from the bottom of the stack. After the blank 30 is removed, the actuating member 81 breaks contact with the arm 80 such that vacuum communication between the cups 74 and the vacuum pump 78 is discontinued. This allows subsequent elements to pick up and move the blank received from the vacuum cups 74.

As shown in FIGURES 2 and 3, a pair of hook rolls 82 are provided which cooperate with the nip rolls 83. The hook rolls 82 are notched as illustrated in FIGURE 3. As the hook rolls 82 and the nip rolls 83 are rotated, the blank 30 is engaged after the vacuum is removed from the vacuum cups 74. The hook rolls 82 and nip rolls 83 move the blank laterally to one side in the direction of its narrow dimension. A plurality of nip rolls 84 cooperate with an elongated straightening roll 85. The nip rolls 84 and straightening roll 85 are mounted and rotated in the machine to receive the blank from the hook rolls 82 and nip rolls 83. Thus the lateral movement of each individual blank is continued until it is deposited on the dead plate 86 where further lateral movement is prevented by the alignment stop 87.

The rolls 82, 83 and the rolls 84, 85 are all driven in unison from the main drive shaft 72 by means of the chain 88 illustrated in FIGURE 2 and the drive sprockets 89 and 90. Similarly, the drive sprocket 91 is also driven from the chain 88 to rotate the cam 92 at a constant speed. The cam 92 is provided with a suitable track to control and provide oscillating movement for the oscillating shaft 76 which controls the movement of the vacuum cups 74.

On being deposited on the dead plate 86 the packaging blank 30 is engaged by the segmented rolls 93 and 94 and thereafter moved longitudinally to the right as viewed in FIGURES 1 and 2. The blank receiving area on the dead plate 86 is then cleared for receipt of the next packaging blank 30. The segmented rolls 93 and 94 move the packaging blank 30 to a pair of constantly driven forwarding rolls 95 and 96 which forward the blanks to the folding and forming portion of the machine.

The segmented rolls 93 and 94 and the forwarding rolls 95 and 96 are driven in unison from the drive shaft 72 by means of the right angle drive 97 (see FIGURES 1 and 2) through the medium of the chain drive 98 which drives the gear 99. The gear 99 drives the gear set 100 and 101 (see also FIGURE 3) which drive the segmented rolls 93 and 94. Similarly, the gear 99 drives the gear set 102 and 103 which in turn drive the forwarding rolls 95 and 96.

The folding and forming section as shown in FIGURES 1 and 2 includes an endless belt 104, the upper flight of which is supported by the dead plate 105. The belt 104 is supported on the pulleys 106 and 107 at its extremes. An idler pulley 108 mounted on the arm 109 is provided to adjust belt tension in cooperation with the idler pulley 110. The pulleys 111, 112 and 113 divert the feed belt under the adhesive applicator as will be described hereinafter. The belt 104 is also continuously driven by the main drive shaft 72 through the right angle gear 114 which drives the pulley 107 through the chain drive 115. The endless belt 104 described heretofore conveys the packaging blanks 30 through the folding and forming section where the blanks are held down against the belt 104 by suitable idler rolls.

On entry into the folding portion of the machine the flat packaging blank 30 is initially passed under a series of idler rolls 116, 117, 118, 119, 120 and 121 which rotate freely on horizontal axes and are suspended from support plate 122 by means of the vertical member 123 (see FIGURES 4, 5 and 6). The support plate 122 runs the length of the machine over the upper flight of the belt 104 such that the several folding and forming elements are attached to and suspended therefrom. A pair of suitably shaped plows 124 and 125 are mounted on either side of the rolls 117, 121 such that on passage beneath the rolls the extending portions 42, 43, 44, 45 and 46, 47, 48, 49 are folded upwardly on the longitudinal scores 31 and 32. As illustrated in FIGURE 6, a pair of idler rolls 126 and 127 mounted on a vertical axis and suspended from the support plate 122 cooperate with the rolls 120 ando 121 to form a right angle bend at the longitudinal score lines 31 and 32.

The packaging blank is then moved to the next group of devices where additional forming and folding operations are performed. These are illustrated in FIGURES 1, 2, 7, 8, 9 and 10 of the drawings. This group of devices is provided to fold and form the packaging blank 30 on the score lines 50, 51, 55 and 56.

In this section a central guide 128 in the form of an inverted T (FIGURE 8) is suspended from the support plate 122 and projects down above the belt 104. Stationary guides 129 and 130 are mounted on either side of the central guide 128. A pair of vertical axis idler rolls 131 and 132 initiate the break in the score lines 50 and 55 as illustrated in FIGURE 8. On further movement the vertical axis idler rolls 133 and 134 (FIGURE 9) form the initial break in the longitudinal score lines 51 and 56.

As the blank 30 continues to move forward, its cross sectional shape is maintained by the elements 135 and 136 (FIGURE 7). As illustrated in FIGURES 7 and 10, a pair of horizontal axis idler rolls 139 and 140 are suspended from support plate 122 to plow down the intermediate areas 53 and 58 against the laterally projecting portions 137 and 138 thus forming right angle bends at each of the longitudinal score lines 50, 51, 55, and 56.

A series of stationary guides are provided to hold the shape of the formed frame and to complete the folding sequence prior to the application of adhesive. As illustrated in FIGURES 2 and 11, the packaging blank 30 is moved into the stationary guides which include the central guide 141 suspended from the support plate 122, the lower portion of which is narrowed as at 142. The outer guides 143 and 144 are provided and are also suspended from the support plate 122. Similarly, the upper guides 145 and 146 maintain the configuration of the package blank 30 essentially as received from the rollers 139 and 140. Due, however, to the narrowed portion 142, the outer areas 54 and 59 are bent inwardly on the scores 51 and 56, respectively.

The frame blank in its movement is then engaged by a second pair of outer guides 147 and 148 as illustrated in FIGURE 12. These guides move the inner areas 52 and 57 of the blank inwardly to form an acute angle between the inner areas 52, 57 and the wall panel portions 38, 39, 40 and 41. As a consequence, a right angle is reformed between the intermediate area 53 and the outer area 54 and also between the intermediate area 58 and the outer area 59 since the outer areas 54 and 59 are moved inwardly against the narrowed portion 142 of the central guide 141.

The outer edges of the outer areas 54 and 59 are then forced downwardly toward the belt 104 by means of wedges 149 one of which is illustrated in FIGURE 1. Thereupon the guides 150 and 151 shown in FIGURE 13 bear upon the intermediate areas 53 and 58 to obtain the configuration illustrated.

Figure 14:
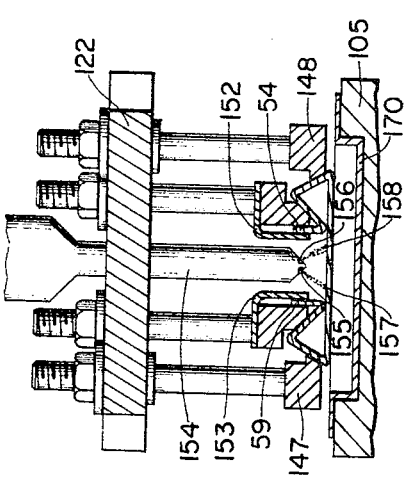
FIGURE 14 is a fragmentary cross section taken on the line 14—14 of FIGURE 2 showing details of the mechanism for applying adhesive to the blank.

The blank is now in position for the application of adhesive by means of a suitable applicator now to be described. On further movement of the blank from the elements of FIGURE 13, a pair of guides 152 and 153 (FIGURE 14) engage the lower surfaces of the outer areas 54 and 59 in the manner illustrated. An adhesive nozzle 154 is suspended from the support plate 122 as illustrated in FIGURE 14. Any well known hot melt adhesive can be supplied to the nozzle although other types of adhesives would be suitable. Hot melt adhesives are preferred, however, since they are especially well suited to high speed operation where quick adherence is desired. Apertures 155 and 156 are provided in the adhesive nozzle 154. As a result, two thin continuous stripes of adhesive 157 and 158 are laid down on the wall panels 38, 39, 40 and 41 of the blank 30. Any adhesive discharged from the nozzle 154 in the absence of a blank 30 is caught in the pan 170 mounted above the pulley 112 (FIGURE 1).

Figure 15:
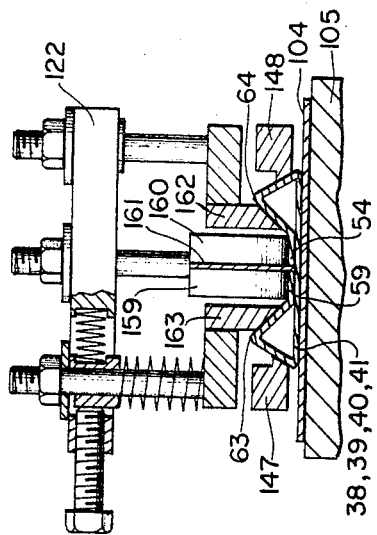
FIGURE 15 is a fragmentary cross section taken on the line 15—15 of FIGURE 2 showing details of the compression device for folding down the flaps after the adhesive is applied.

The blank then passes beneath the guides 159 and 160 (FIGURE 15) having a central blade 161 therebetween. The guides 159 and 160 fold down the outer areas 54 and 59 against the wall panels 38, 39, 40 and 41 to adhere these elements along the adhesive stripes 157 and 158 previously applied. The blade 161 is provided to prevent overlap of the outer areas 54 and 59 when they are folded down. Similarly, the guides 162 and 163 suspended from the support plate 122 maintain the configuration of the tubular support elements 63 and 64 during the adherence step.

Figure 16:
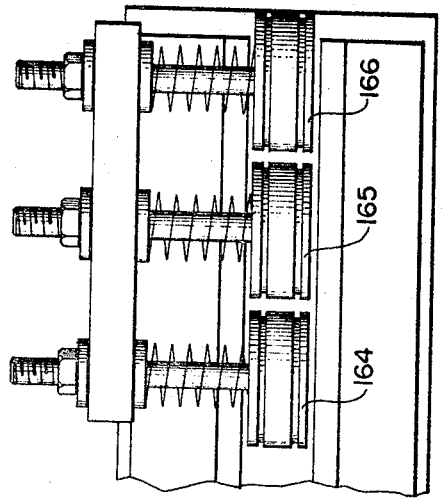
FIGURE 16 is a fragmentary plan view in cross section taken on the line 16—16 of FIGURE 1 showing the details of the compression rolls.

As a last step in the formation of the frame blank 60, a series of compression rolls 164, 165 and 166 shown in FIGURES 1 and 16 are provided. The compression rolls are also suspended from the support plate 122 and bear down against the outer areas 54 and 59 to maintain them in contact with the wall panels 38, 39, 40 and 41 during the short period of time necessary for the hot melt adhesive to solidify and permanently join the elements to form the frame blank 60 as seen in FIGURE 18 as it issues from the last compression roll 166.

The completed frame blank 60 may then be formed by hand or other suitable apparatus into a finished package. Preferably it can be formed into a package of the kind described in the Burt et al. Patent 3,262,620 as previously indicated.

While particular embodiments of the invention have been illustrated and described, it will be obvious to those skilled in the art that various changes and modifications can be made without departing from the spirit and scope of the invention and it is intended to cover in the appended claims all such changes and modifications that are within the scope of this invention.

What is claimed as new is:

1. A machine for forming a frame blank comprising a hopper for receiving a plurality of flat packaging blanks in a stack, said blanks including a plurality of adjoining wall panels and extending portions projecting laterally from the sides of said wall panels, a plurality of parallel longitudinal scores dividing said extending portions into a plurality of areas, means for removing individual blanks from said hopper, means for thereafter aligning each successive blank longitudinally prior to feeding same into a frame former, means for moving each successive blank forward into the frame former, folding means in said frame former for folding said extending portions of said packaging blanks on said longitudinal scores to form a tubular support from each of said extending portions, said tubular support having essentially straight sides in cross section corresponding to the areas formed on said extending portions by said longitudinal scores, and means for adhering said tubular supports to said wall panels to complete said frame blank.

2. A machine for forming a frame blank as claimed in claim 1 wherein said folding means comprises an endless belt running over a dead plate for carrying the blank through the frame former, a stationary support plate mounted over and spaced from the upper flight of said endless belt, and a plurality of folding devices suspended from said support plate.

3. A machine for forming a frame blank as claimed in claim 2 including means for folding said frame blank on the score lines separating the wall panels from their laterally projecting extending portions, said means including a plurality of horizontal axis idler rolls mounted for free rotation on their axes and suspended from the support plate, a pair of plows on either side of said horizontal axis idler rolls for making the initial break in the score between the wall panels and the extending portions and a pair of vertical axis idler rolls mounted for free rotation on their axes and suspended from the support plate and spaced outwardly from the last of the horizontal axis idler rolls, said vertical axis idler rolls and said last of the horizontal axis idler rolls forming a right angle fold at the score separating the wall panels from their laterally projecting extending portions.

4. A machine for forming a frame blank as claimed in claim 3 including means for folding said frame blank on the parallel longitudinal scores dividing said extending portions into a plurality of areas, said last mentioned means including a central guide bar having lateral projecting lower portions, said guide bar suspended from said support plate, vertical axis idler rolls mounted for free rotation on their axes for folding the extending portions of the frame blank inwardly against the central guide bar and breaking said longitudinal scores dividing said extending portions, and a pair of horizontal axis idler rolls mounted for free rotation on their axes to form right angle folds between adjacent areas of said extending portions by folding the frame blank against the central guide bar and its lateral projecting lower portions.

5. A machine for forming a frame blank as claimed in claim 4 including a plurality of shaped stationary guides for maintaining and forming the areas of said extending portions into tubular support elements having a triangular cross section.

6. A machine for forming a frame blank as claimed in claim 1 wherein said means for removing individual blanks from said hopper includes a plurality of oscillating vacuum cups for delivering successive individual blanks to a pair of hook rolls, each of which cooperates with a nip roll, a straightening roll, and a plurality of cooperating nip rolls positioned laterally of said hook rolls for receiving successive individual blanks therefrom and for delivering individual blanks against a stop where they are laterally aligned and a pair of cooperating segmented rolls for moving the individual frame blanks lengthwise to a pair of forwarding rolls.

7. A machine for forming a frame blank as claimed in claim 5 wherein said folding means comprises an endless belt running over a dead plate for carrying the blank through the frame former, a stationary suppprt plate mounted over and spaced from the upper flight of said endless belt, and a plurality of folding devices suspended from said support plate.

8. A machine for forming a frame blank as claimed in claim 7 including means for folding said frame blank on the score lines separating the wall panels from their laterally projecting extending portions, said means including a plurality of horizontal axis idler rolls mounted for free rotation on their axes and suspended from the support plate, a pair of plows on either side of said horizontal axis idler rolls for making the initial break in the score between the wall panels and the extending portions and a pair of vertical axis idler rolls mounted for free rotation on their axes and suspended from the support plate and spaced outwardly from the last of the horizontal axis idler rolls, said vertical axis idler rolls and said last of the horizontal axis idler rolls forming a right angle fold at the score separating the wall panels from their laterally projecting extending portions.

9. A machine for forming a frame blank as claimed in claim 8 including means for folding said frame blank on the parallel longitudinal scores dividing said extending portions into a plurality of areas, said last mentioned means including a central guide bar having lateral projecting lower portions, said guide bar suspended from said support plate, vertical axis idler rolls mounted for free rotation on their axes for folding the extending portions of the frame blank inwardly against the central guide bar and breaking said longitudinal scores dividing said extending portions, and a pair of horizontal axis idler rolls mounted for free rotation on their axes to form right angle folds between adjacent areas of said extending portions by folding the frame blank against the central guide bar and its lateral projecting lower portions.

10. A machine for forming a frame blank as claimed in claim 9 including a plurality of shaped stationary guides for maintaining and forming the areas of said extending portions into tubular support elements having a triangular cross section.

References Cited

UNITED STATES PATENTS

| | | | |
|---|---|---|---|
| 2,669,167 | 2/1954 | Behl | 93—49 |
| 2,900,882 | 8/1959 | Theobald | 93—84 |

BERNARD STICKNEY, *Primary Examiner.*